United States Patent [19]
Close

[11] Patent Number: 5,811,483
[45] Date of Patent: Sep. 22, 1998

[54] WATER REPELLENT SYSTEM

[75] Inventor: Donald Close, Stow, Ohio

[73] Assignee: Syn-Coat Enterprises, Inc., Stow, Ohio

[21] Appl. No.: 625,823

[22] Filed: Apr. 1, 1996

[51] Int. Cl.⁶ ............................... C08K 3/00; C08L 51/00
[52] U.S. Cl. ........................... 524/500; 524/540; 524/588
[58] Field of Search .................................... 524/500, 540, 524/588

[56] References Cited

U.S. PATENT DOCUMENTS

| | | | |
|---|---|---|---|
| 4,267,297 | 5/1981 | Hanada et al. | 528/18 |
| 4,594,109 | 6/1986 | Kawabata | 106/271 |
| 4,741,773 | 5/1988 | Kuroda et al. | 106/2 |
| 5,162,407 | 11/1992 | Turner | 524/108 |
| 5,300,327 | 4/1994 | Stark-Kasley et al. | 427/387 |
| 5,302,382 | 4/1994 | Kasprzak | 424/78.03 |
| 5,321,083 | 6/1994 | Hanada et al. | 525/102 |
| 5,346,943 | 9/1994 | Khunger et al. | 524/398 |
| 5,378,521 | 1/1995 | Ogawa et al. | 428/85 |
| 5,421,866 | 6/1995 | Stark-Kalsey et al. | 106/2 |

*Primary Examiner*—Kriellion S. Morgan
*Attorney, Agent, or Firm*—Oldham & Oldham Co., LPA

[57] ABSTRACT

A water repellent composition is disclosed which includes a silicone rubber gum polymer or a room temperature vulcanizable polymer in synergistic combination with a second polymer selected from the group consisting of polybutene, linseed oil, phenolic resin, polyurethane, ethylene-propylene diene monomer and acrylic resin, and an organic solvent in which the silicone rubber gum polymer and the second polymer are at least partially soluble therein. The composition may optionally include a mildewicide, a pigment and an inhibitor. The blend ratio of the silicone rubber gum polymer is from 98 to 2% by weight and the ratio of the second polymer is from 2 to 98% by weight, although in a preferred embodiment, the ratio is essentially equal. When polybutene is present, optionally at least a portion is epoxidized.

26 Claims, No Drawings

WATER REPELLENT SYSTEM

TECHNICAL FIELD

The invention described herein pertains generally to water repellent systems, especially synergistic blends of certain polymers. More particularly, this invention relates to liquid systems useful for providing protection against water intrusion when applied to structural material such as wood, cement, stone, stucco and composites used in the construction industry. Specifically, this invention relates to certain silicone polymers in synergistic combination with a second polymer which is of lower molecular weight and deeper penetrating than the silicone polymer, the second polymer being selected from the group consisting of polybutene polymers, linseed oil, phenolic resins, acrylic resins, polyurethane and ethylene-propylene diene monomer, in combination with each other and other polymers.

BACKGROUND OF THE INVENTION

Wood is a universally used construction material. It has a history of good longevity where it is used in areas exempt from exposure to the elements. When wood is used where it is subjected to the weather, it does not have desired durability. Typical uses for wood exposed to the elements are cedar shake roofing, decks, siding, walkways, pedestrian bridges, docks, piers, arbors and trellises. Weather exposure introduces the following degradation forces: UV degradation, mildew, rot, splitting, heat, cold, dimensional stability and warping. Trees are a valuable natural resource and it is extremely desirable to increase the longevity of structures made out of wood that are exposed to the elements. Creosote has proven to be a good preservative, but lacks aesthetics and is highly toxic. Toxic substances are forced into wood via pressure in an autoclave and sold as pressure treated wood. This treatment does lengthen the life of wood structures and is used almost exclusively in decking. Negative aspects of pressure treated wood are its toxicity, high density and the fact that the protective toxins eventually leach out. Various types of paints are used to provide a barrier between the elements and wood. Most paints are essentially a surface film and subject to peeling, cracking and fading. Wood is a difficult base material to work with in that it is not dimensionally stable and swells and shrinks in response to climate changes. Vapor pressure from under the paint can cause loss of adhesion and peeling. Paint also can be eroded from the effects of wind driven particulate matter and rain.

To a lesser extent, other materials such as cement compounds and natural stone are also deteriorated by exposure to the elements. When water penetrates into a substrate and then freezes, the substrate cracks and offers more avenues for water intrusion. As the freeze/thaw cycle continues, the material continues to lose structural integrity.

While various protective products are commercially available which are indicated to have efficacy in the water repellent field, these products do not possess a sufficient effective usage period and require frequent re-application. The need still exists for a product which maintains its water-repellent efficacy for longer periods of time.

SUMMARY OF THE INVENTION

In accordance with the present invention, there is provided a water repellent system which provides a surface barrier to the elements. This is effected via application of a solution of the system which penetrates the surface of the substrate in order to provide protection in the subsurface area. The saturant system does not freeze or embrittle due to weathering and is easily manufactured and applied. Customization is possible by the addition of tinting agents to the clear saturant.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time. The examples are illustrative only and not meant to limit the invention, as measured by the scope and spirit of the claims.

The water repellent system comprises solutions of various silicone rubber gums and/or polysiloxane polymers in combination with various other polymers to synergistically effect an improved water repellency over the use of either polymer alone. The system will have at least two components: (a) a silicone rubber gum and/or polysiloxane polymer; and (b) a second resin selected from the group consisting of linseed oil, polybutene, phenolic resins, (meth)acrylic resins, polyurethane and ethylene-propylene diene monomer.

Silicone Rubber gum polymers which are effective in this application are quite stable due to the Si-O linkage in the backbone. They may contain vinyl or methyl chain ends. Most of these polymers contain methyl groups attached to the backbone. Their viscosity is relatively stable through a broad temperature range. They are hydrophobic and clear. Although they are effective water repellents when used as a simple solvent cut, their performance is enhanced by blending them with certain other polymers. Outstanding water repellent properties are evidenced when they are blended with polybutenes, linseed oil, and phenolics. A silicone fluid when blended with a phenolic powder also offered good water repellent properties.

A non-limiting exemplary list of silicone rubber gums and/or polysiloxane polymers would include moieties such as GE® SE64 Silicone Rubber Gum (a medium vinyl level gum with terminal methyl groups) and GE® SGS 1000 RTV (a room temperature vulcanizing caulk compound). Silicone oils such as GE® 4029 Silicone fluid (a methylphenylsiloxane copolymer used as a plasticizer in silicone rubber compounds) and GE® 4026 (a silanol-stopped siloxane liquid), may be present, but not as the major component.

The silicone gum may be described as a polydiorganosiloxane having recurring structural units of the formula —Si($R^1$)($R^2$)—O— wherein the radicals represented by $R^1$ and $R^2$, which may the same or different, are monovalent hydrocarbon radicals or substituted hydrocarbon radicals. Suitable hydrocarbon radicals include $C_{1-8}$ alkyl radicals such as methyl, ethyl, butyl, and hexyl; $C_{1-8}$ alkenyl radicals such as vinyl; aryl radicals such as phenyl and tolyl; $C_{6-24}$ aralkyl radicals and $C_{6-24}$ alkaryl radicals. Suitable substituted hydrocarbon radicals include halogenated radicals such as trifluoropropyl, chlorophenyl and dichlorophenyl, and cyanated radicals such as cyanoethyl, cyanopropyl and cyanophenyl. In a preferred embodiment, at least half of the radicals should be methyl; and in many cases all of the radicals are methyl although in some embodiments of this invention, a proportion of the radicals are vinyl radicals.

The silicone rubber gum may be a homopolymer, such as poly(methyltrifluoropropylsiloxane), poly(methylcyanoethylsiloxane), or poly (methylphenylsiloxane), or a copolymer of dimethylsiloxane with a siloxane of the formula $R_2SiO$ in which one or both R radicals are other than methyl. End groups, not shown in the above formula are of secondary importance and their nature is typically not critical. Examples of suitable end groups include hydroxy; alkoxy, e.g., methoxy and ethoxy; and trisubstituted siloxy, e.g., trimethylsiloxy, dimethylvinylsiloxy, and methyldiphenylsiloxy. The number of recurring units in the polydiorganosiloxane can vary, but in one embodiment of this invention, should be at least 2,000.

Silicone RTV compounds which are effective in this invention contain thixotropy so they can be applied as caulks. Fumed silica imparts this property. The exterior versions of these caulks are cured by moisture. They remain flexible and water-resistant for extended periods of time. A clear compound was obtained from GE (SGS 1000 RTV) and solvated. RTV silicone rubber comprises a silanol-terminated polysiloxane and a multifunctional silane. As purchased, the rubber typically contains a metal-containing curing catalyst optionally with an adhesion agent and/or a surfactant. In one embodiment, the sealant includes a volatile or subliming chelating agent to tie up the metal atoms in the catalyst and prevent curing of the composition in its storage container. When the RTV silicone rubber is applied to a porous substrate, such as wood, masonry or concrete, it is in a nonaqueous volatile solvent, which penetrates the substrate, carrying the uncured rubber into the interstices of the porous substrate. As the solvent evaporates, the silicone rubber is deposited in the pores and interstices of the porous substrate. After drying (and to some degree during the solvent evaporation), the material cures by chemical reaction, forming a stiff insoluble rubber compound interspersed throughout the substrate. The substrate becomes waterproof or water resistant, because of the water repellency of the silicone. Unlike silicone oils, the RTV silicone rubber is molecularly bonded to itself to form very large molecules which are extended through the substrate and thereby locked into the substrate.

The silanol-terminated polysiloxane component of the RTV silicone rubber is a polymer having a Si—O—Si backbone terminating with at least one OH group. The silicone molecules may have substituents such as alkyl groups, or substituents which participate in the crosslinking reactions with the silanol groups, such as acetoxy, enoxy amine, oxime and alkoxy, as it is understood in the art. Preferably, the silanol-terminated polysiloxane is a silanol-terminated polydimethylsiloxane. These polysiloxanes have a molecular weight greater than about 2000 and up to about 300,000, and more preferably sufficiently high to be classified as a gum rather than a liquid, e.g., about 26,000 and above, with a preferably upper limit of about 200,000.

The multifunctional silane component of the RTV silicone rubber is preferably an acyloxy, enoxy or oxime silane, more preferably an acetoxy silane. Any multifunctional silane may be used having as substituents reactive groups which condense with the OH groups of the silanol-terminated polysiloxane in the presence of atmospheric moisture to form a branched, crosslinked polymer, as is understood in the art. The percentage of silane in the mixture should be sufficient to crosslink the polysiloxane so as to form a rubbery mass by producing a tangled chain with occasional crosslinked bridges. As known in the art, too much silane can make the cured composition hard and brittle, and too little will not allow the mixture to become solid and firm. A preferred percentage of silane to polysiloxane is about 0.1%, and more preferably about 1% to about 5%. Preferably, the silane is one which forms reaction products with the polysiloxane which are non-toxic and non-corrosive.

It is possible to include silicone oils of high viscosity, e.g., up to about 30,000 to 60,000 cps, to supplement the water repellency of the products and can be used in an amount up to, but not exceeding, the amount of the other ingredients, so long as the ability to achieve a firm set is not interfered with. A preferred amount of such oils is about 1–2% of the total composition or less.

One of the aspects of this invention lies in the combination of the above silicone compounds with a synergistic amount of a lower molecular weight second polymer which is capable of deeper penetration into the substrate than the silicone component. When working with a porous substrate, not only is water penetration from the upper surface significant, but so is water infiltration from below the surface due to capillary action with the pores of the substrate. By combining the surface protection achieved with the silicone component of this invention with the deeper sub-surface protection of a second more deeply penetrating polymer solution, protection is achieved in at least two directions. Examples of this second synergistic polymer includes linseed oil, polybutenes, phenolic resins, acrylic resins, polyurethanes and ethylene-propylene diene monomers.

Linseed oil is a natural product comprised primarily of linolenic, oleic, linoleic and saturated fatty acids and is derived from the seeds of the flax plant Linum usitatissimum by expression or solvent extraction.

The polybutenes which are effective in this invention include a series of isobutylene-butane copolymers composed predominately of high molecular weight mono-olefins, the balance being essentially isoparaffins. They are generally colorless, resistant to oxidation by light and heat, non-drying and completely hydrophobic. They are available in viscosities ranging from light oils to highly viscous fluids. Epoxidized versions are also available. The lower molecular weight versions have a tendency to penetrate deeper into the wood substrates. As the molecular weight increases, less penetration and more surface protection is afforded. The test results show that blending various viscosity polybutenes, both regular and epoxidized versions with certain polymers, water repellency properties are superior to commercial water repellent systems. Successful blend polymers include acrylic, phenolic and silicone rubber gum.

Examples of polybutenes which are useful in this invention would include Amoco® H1500 Polybutene (a high viscosity polybutene with a 2010 average molecular weight), Amoco® H300 Polybutene (a medium viscosity polybutene with a 1290 average molecular weight), Amoco® E23 (an epoxidized liquid polybutene of medium viscosity), and Amoco® E6 (a lower viscosity epoxidized polybutene). The polybutenes listed of course are merely illustrative of the broader class of polybutene polymers, commercially available as a series of isobutylene-butene copolymers composed predominantly of high molecular weight mono-olefins (95–100%), the balance being isoparaffins. Polybutenes are typically made by polymerizing an isobutylene-rich butene stream with a metal halide catalyst. The polymer backbone structure resembles polyisobutylene, although more 1- and 2-butenes are incorporated in the lower molecular weight fractions. Molecular weight distributions range from about 50 to 15,000. Because of their highly substituted structure, the polymers have very low glass-transition temperatures and pour points. The olefin structure is predominantly the trisubstituted type ($R$—$CH$=$CR_2$). Only minor amounts of vinylidene (R—CH$_2$—C(=CH$_2$)—R and terminal vinyl (R—CH=CH$_2$) structures are present. Derivatives of polybutenes can be made by the chemical reactions common to aliphatic mono-olefins, and addition of various reagents to the double bond can occur by free-radical or ionic mechanisms, as in the addition of chlorine or hydrogen bromide, or in the alkylation of isoparaffins or aromatics.

Examples of phenolic resins which are effective in this invention include Varcum® 29-033 (a heat reactive phenolic resin), Varcum® 29-008 (a novolac® resin, a thermoplastic phenol-formaldehyde type, used for tackitying rubber) and other similar types of synthetic thermosetting resins obtained by the condensation of phenol or substituted phenols with aldehydes such as formaldehyde, acetaldehyde and furfural.

Examples of (meth)acrylic resins effective in this invention would include Elvacite® Acrylic resins, supplied by DuPont. These acrylic-based thermoplastic resins are polymers or copolymers of methyl methacrylate or other acrylic monomer, stable up to 177°–232° C., well above their softening range. These resins are available in a wide range of molecular weight, flexibility and functionality and are particularly well suited for protective coatings. The Elvacite® resins are of four major types, i.e., methyl methacrylate resins, methacrylate copolymer resins, ethyl methacrylate resins and butyl methacrylate resins. The resins have molecular weight ranges from a low of about 25,000 to a high of about 350,000. One specific example of this resin is Elvacite® 2046, a butyl methacrylate resin of high molecular weight, although other acrylate-based resins are certainly contemplated within the scope of this invention, the use of the above product merely being illustrative of a class of acrylate polymers.

Solvents which are suitable for use with the water repellent systems of the invention may include any solvents or mixtures of solvents of the kind capable of dissolving the constituents of each system. In general, the solvent should be a volatile one which readily evaporates at room temperature after application to the substrate. Preferably, the solvent has a boiling point between about 50° C. to about 325° C., more preferably between about 180° C. and about 275° C., and most preferably between about 180° C. and about 225° C.

The solvent should be one in which the sealant mixture continues to be soluble or suspended as the remaining solvent evaporates, until curing takes place and no further segregation of the solvent/solute is likely. Useful solvents include petroleum fractions such as Stoddard solvent, naphtha and its associated grades (e.g., mineral spirits); alcohols, particularly C$_{1-4}$ alcohols, such as methyl, ethyl, propyl, isopropyl, butyl, isobutyl, and tert-butyl alcohols; esters including C$_{1-4}$ esters, such as ethyl acetate, methyl acetate, and propyl acetate; chlorinated hydrocarbons such as 1,1,1-trichloroethane, perchloroethylene, trichloromethane, methylene dichloride and other halogenated hydrocarbons such as freons; aromatic hydrocarbons such as toluene, benzene, xylene and ethyl benzene; aliphatic hydrocarbons such as hexane, heptane and cyclohexane; glycol ethers such as the ethylene glycolmethyl ether, ethylene glycol butyl ether; proprietary solvents such a Cellosolve, a product of Union Carbide, or Dowanol, a product of Dow Chemical Company; and ketones, such as acetone, dimethyl ketone and ethyl methyl ketone. Mixtures of the foregoing solvents may also be used.

Preferably, the solvent is one which is non-toxic and meets environmental regulations. Examples of such solvents are Stoddard solvent, aliphatic hydrocarbons, glycol ethers, propyl alcohol and ethyl alcohol. Other factors to be balanced in choosing a solvent for use in the composition of this invention include flash point, as materials with low flash points, e.g., less than about 100°–120° F., are less preferred for consumer application. The tendency to absorb water is also a factor in choosing an appropriate solvent, as the presence of water in the composition prior to application causes premature crosslinking with RTV silicones, and tends to degrade the product. Care must be taken to ensure that the solvent does not contain water before mixing. Dehydrating agents such as silica gel and sodium sulfate may be used for this purpose. When commercial available glycol ethers such as Cellosolve and Dowanol are used, for example, they must be dried first. For environmentally sensitive applications, solvents sold by the Shell Chemical Co. and sold under the trade name Neosolv may be incorporated into the solvent or be the solvent. This solvent currently meets the California Air Resources Board (CARB) volatile organic compound (VOC) emission regulations. Oxychem Corp. also manufactures a proprietary solvent Oxsol® 100 that is VOC exempt. This solvent can be blended with aliphatic or aromatic solvents to lower VOC content. It can be used as the sole solvent in the experimental systems for total VOC exemption. Cost considerations however are significant. Another way to lower VOC levels is to substitute mineral oil for a portion of the solvent. Combining mineral oil and Oxsol® 100 for a portion of the regular solvent system is also possible.

Catalysts may be used to enhance the crosslinking reaction. Tin soaps are effective catalysts. The catalyst should be one which enhances the rate of condensation reactions. In the RTV silicone rubbers, metal soaps are often used as catalysts to accelerate the cure. These metal organic compounds probably function by facilitating hydrogen transfer. Tin soaps, zinc soaps, and other metal soaps or metal salts of carboxylic acids, tin octooctoate and titanates serve in this function.

The sealant composition may also contain a volatile or subliming metal chelating agent which ties up the metal atoms in the catalyst so as to prevent curing of the composition while in its storage container prior to application. Typical prior art compositions had to be used immediately upon opening because they began to cure on contact with atmospheric moisture. However, when volatile or subliming chelating agents are present, the composition may be opened for use, closed and reused later. The volatile or subliming chelating agent should be one that evaporates or sublimes at room temperature after application at about the same rate as the volatile solvents for convenience in use. However, if the chelating agent is slower or faster in dissipating than the solvent, this will not generally interfere with the curing reaction.

The chelating agent should preferably be present in an amount at least sufficient to tie up all metal atoms in the catalyst to prevent catalyzation of the cure reaction. Generally amounts of chelating agents of at least 0.01% by weight of the solvent will be useful, preferably an amount at least equimolar to the metal atoms in the catalyst is used, and more preferably, excess chelating agent is used, e.g., 1 or 2 weight percent, so as to provide protection against curing even after some preferential evaporation of the chelating agent in the container has occurred. Up to one hundred times the molar amount of catalyst metal of chelating agent may be used at times. Suitable exemplary volatile or subliming chelating agents would include orthophenanthroline, α,α'-dipyridyl and 1,4-dioxane, or mixtures thereof.

The sealant composition may optionally contain an adhesion agent to aid in bonding of the crosslinked sealant to the substrate. For this purpose, organofunctional silanes which form molecular bonds with the substrate and also with the cured silicone rubber polymer are useful. One exemplary adhesion agent is vinyl tris(2-methoxyethyoxy)silane. The adhesion aid should be present in an amount providing improvement in adhesion properties without interfering with crosslinking of the sealant, preferably between 0.1% to about 5% by weight, and preferably about 0.2%.

The composition may optionally contain a surfactant. RTV rubber tends to migrate and separate during the evaporation stage of the curing. Although the coating is still effective, there can be isolated regions which are less well protected due to this migration. If the protective coating is applied to a smooth, non-porous substrate, such as glass, this tendency to migrate and produce an uneven coating is possible. The addition of certain surfactants, especially fluorocarbon surfactants was effective in diminishing or entirely eliminating the tendency of the components to migrate and separate. One example of this class of surfactants is 3M FC-430a, a proprietary non-ionic fluorochemical liquid surfactant. Another useful surfactant is FC-740 of 3M, a non-ionic fluoroaliphatic polymeric ester.

The concentration of the surfactant depends on the exact compound used as well as the intended application and can be easily determined without undue experimentation. The concentration should be high enough to effectively prevent migration of the curing components, but not so high as to cause undesirable foaming action when the product is brushed or shaken. Concentrations of between about 0.01% and 0.1% by weight would be appropriate.

Pigments can be added to the composition if desired so long as they are suspendable in the mixture and do not adversely react with the other components or change the properties of the cured rubber product. A number of pigments are suitable, and a non-exhaustive exemplary list would include Burnt umber 811 and other oil soluble pigments of various colors such as supplied for example by Winsor & Newton wherein the vehicle in these oil colors is linseed oil. Trace amounts of these pigments are easily added to the experimental water repellents. This proved to be an effective tinting method.

Additional stabilizers may be present in the system to impart added benefits or to achieve specialized results for particular environments. Ultraviolet absorbers (UVA) may be added, such as those sold by Ciba-Geigy under the trade name Tinuvin, a benzotriazole compound as shown in formula (I) wherein the R groups are varied, by include H, $C_{1-4}$ alkyl, $C_{6-12}$ aryl, $C_{6-24}$ alkaryl, and $C_{6-24}$ aralkyl.

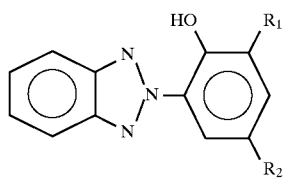

(I)

Light stabilization is also important in these systems, and hindered amine light stabilizers (HALS) may be added into the system, such as those sold by Ciba-Geigy under the trade name Tinuvin as shown in formula (II) wherein $R_1$ and $R_2$ are as previously defined.

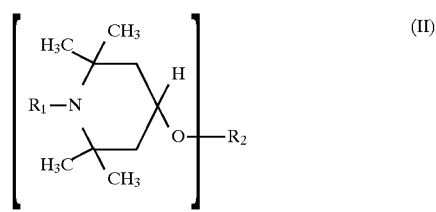

(II)

Antioxidants (AO) may also be added, such as those sold by Ciba-Geigy under the trade name Irganox as shown in formula (III).

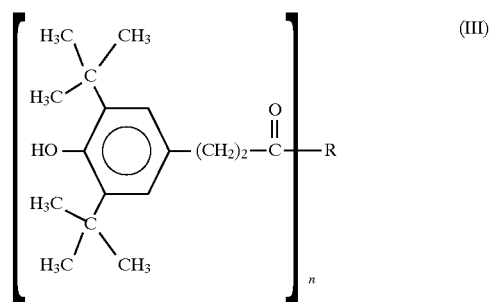

(III)

wherein R is selected from the group consisting of $C(CH_2O)_4$— and n=4, —$OC_{18}H_{37}$ and n=1, —$O(CH_2)_2$—S—$(CH_2)_2O$— and n=2, and —HN—NH— and n=2.

Optionally a mildewicide may be added, such as that commercially available from the Troy Chemical Company, sold under the trade name Troysan AF1, a 3-iodo-2-propynl butyl carbamate in high flash naphtha or from the Buckman Laboratories, Inc., sold under the trade name Busan 1009, a combination of aromatic hydrocarbon solvent, methanol, 2-(thiocyanomethylthio)benzothizaole, methylene bis (thiocyanate), diethylene glycol monomethyl ether and other proprietary components.

The testing procedure used to obtain the experimental data contained in this application included forming 40 separate test area segments in untreated white pine boards which were nailed onto pressure-treated wooden cross members. Separation was effected by cutting slots into the pine boards thereby preventing migration of the water repellent from one test area to the adjacent test area. The racks were positioned horizontal to the ground to maximize the water ponding on the surface and increasing water exposure time. All experimental water repellents were prepared by adding the listed components in the following tables to solvent in a mixing vessel until a uniform solution was obtained.

The test area segments were then coated with four commercial and 36 experimental water repellents on each test rack. Two identical racks were constructed. One rack was placed in Sarasota, Fla., about ¼ mile from the Gulf of Mexico where the samples were exposed to a semi-tropical environment. Temperatures of up to 100° F. were encountered as well as exposure to salt air and fog which was prevalent. The second rack was located in Stow, Ohio, where it was exposed to temperatures ranging from sub-zero to the mid-90's.

Application of all water repellents was by application by a brush or roller, with removal of any excess puddled product after 15 minutes. In commercial applications, a second coat may be applied if necessary. Application coverage will vary depending upon the substrate. Smooth wood absorbs at a rate of 200–300 sq. ft./gal. whereas rough wood, only 100–150 sq. ft./gal. may be possible.

The evaluation procedure included placing measured water droplets onto all test samples and measuring the amount of time for the water bead to disappear. The data contained in Table 1 was derived from the Florida location, although almost similar data was obtained at the Ohio location. The test exposure time was identical at both locations. As a base case, four commercially available products were tested for their water repellent efficacy as shown in Table 1.

TABLE 1

| Component | Parts by Weight | | | |
|---|---|---|---|---|
| | 1 | 2 | 3 | 4 |
| Thompson's Water Seal | 100 | | | |
| DAP Woodlife Clear Wood Preservative | | 100 | | |
| Flood CWF Clear Wood Preservative | | | 100 | |
| Olympic Wood Preservative | | | | 100 |
| Beading Time (min.) | 4 | 4 | 4 | 4 |

The above products were used as purchased and applied in accordance with manufacturer's instructions. As clearly shown in the above Table, the effective beading time until complete penetration into the wood product was quite limited, i.e., 4 minutes for the four commercially available products tested.

Various experimental compositions were then compared to the base case above. In all instances, the effective active ingredient concentration was approximately 15% by weight. An effective result would then be a measurable increase in effective beading time over the above 4 minute benchmark. The experimental formulations were numbered 5 through 40 as shown in Table 2.

TABLE 2

| | | Parts by Weight | | | | | | | | | | | |
|---|---|---|---|---|---|---|---|---|---|---|---|---|---|
| | Component | 5 | 6 | 7 | 8 | 9 | 10 | 11 | 12 | 13 | 14 | 15 | 16 |
| Silicone | GE 4029 Silicone Fluid | | | | | | | | | | | | |
| | GE 4026 Silicone Oil | 2 | | | | | | | | 2 | | | |
| | GE SGS 1000 RTV | | | | | | | | | | | | |
| | GE SE64 Silicone Rubber Gum | | | | | | | | | | | | |
| Polybutene | Amoco Indopol H1500 | | | | | | | | | | | | |
| | Amoco Indopol H300 | | | | | | | | | | 5 | | |
| | Amoco Indopol E23 | | | | | | | | | | | | |
| | Amoco Indopol E6 | | | | | | | | | | | | |
| Acrylic Resin | Elvacite 2046 | | | | | | | 10 | 5 | 8 | 5 | 10 | |
| | Elvacite 2045 | 8 | 8 | | 5 | | | | | | | | |
| | Elvacite 2044 | | | 10 | 5 | 5 | 5 | | | | | | |
| Phenolic Resin | Varcum 29-033 | | | | | 5 | | | | | | | |
| Polyurethane | H2000 | | | | | | | | | | | | |
| EPDM | Uniroyal CP80 | | | | | | | | | | | | |
| Linseed Oil | | | | | | | 5 | | 5 | | | | |
| Mildewicide | Busan 1009 | | | | | | | | | | | | |
| | Troysan AF1 | | | | | | | | | | | | 1.3 |
| Pigment | Burnt Umber 811 | | | | | | | | | | | .2 | |
| Inhibitor | Tinuvin 292 | | | | | | | | | | | | .3 |
| Solvent | Toluene | 10 | 10 | 10 | 10 | 10 | 10 | 10 | 10 | 10 | 10 | 10 | 10 |
| | Mineral Spirits | 47 | 47 | 47 | 47 | 47 | 47 | 47 | 47 | 47 | 47 | 47 | 47 |
| | Acetone | | | | | | | | | | | | |
| | Xylene | | | | | | | | | | | | |
| Beading Time (min.) | | 4 | 4 | 4 | 4 | 4 | 4 | 4 | 4 | 4 | 10 | 4 | 4 |

| | | Parts by Weight | | | | | | | | | | | |
|---|---|---|---|---|---|---|---|---|---|---|---|---|---|
| | Component | 17 | 18 | 19 | 20 | 21 | 22 | 23 | 24 | 25 | 26 | 27 | 28 |
| Silicone | GE 4029 Silicone Fluid | | | | | | | | | | | | |
| | GE 4026 Silicone Oil | | | 2 | | | | | | | | | |
| | GE SGS 1000 RTV | | | | | 10 | 5 | 5 | | | | | |
| | GE SE64 Silicone Rubber Gum | | | | | | | | 5 | 5 | 5 | 5 | 5 |
| Polybutene | Amoco Indopol H1500 | | | | | | | | | | | | |
| | Amoco Indopol H300 | | | | | | 5 | | 5 | | | | |
| | Amoco Indopol E23 | | | | | | | | | | | | |
| | Amoco Indopol E6 | | | | | | | | | | 5 | | |
| Acrylic Resin | Elvacite 2046 | | | | | | | | | | | | |
| | Elvacite 2045 | | | | | | | | | | | | |
| | Elvacite 2044 | 10 | 10 | | | | | | | | | | |
| Phenolic Resin | Varcum 29-033 | | | | | | | | | | | | 5 |
| Polyurethane | H2000 | | | | 10 | | | | | | | | |
| EPDM | Uniroyal CP80 | | | | | | | | | | | | |
| Linseed Oil | | | | | | | | | 5 | 5 | 5 | | |
| Mildewicide | Busan 1009 | | 1.3 | | 1.3 | | | | | | | 1.3 | 1.3 |
| | Troysan AF1 | 1.3 | | 1.3 | | | | | | | | | |
| Pigment | Burnt Umber 811 | | | | | | | | | | | | |
| Inhibitor | Tinuvin 292 | .3 | | .3 | | | | | | | | | |

TABLE 2-continued

| Solvent | Toluene | 10 | 10 | 10 | 10 | | | | | | | | |
| --- | --- | --- | --- | --- | --- | --- | --- | --- | --- | --- | --- | --- | --- |
| | Mineral Spirits | 47 | 47 | 47 | | 57 | 57 | 57 | 57 | 57 | 57 | 40 | 40 |
| | Acetone | | | | 47 | | | | | | | | |
| | Xylene | | | | | | | | | | | 17 | 17 |
| Beading Time (min.) | | 4 | 4 | 4 | 4 | 25 | 39 | 49 | 160+ | 130 | 160+ | 160+ | 160+ |

| | | Parts by Weight | | | | | | | | | | | |
| --- | --- | --- | --- | --- | --- | --- | --- | --- | --- | --- | --- | --- | --- |
| | Component | 29 | 30 | 31 | 32 | 33 | 34 | 35 | 36 | 37 | 38 | 39 | 40 |
| Silicone | GE 4029 Silicone Fluid | | | 3 | 5 | 5 | | | | | | | |
| | GE 4026 Silicone Oil | | | | | | | | | | | | |
| | GE SGS 1000 RTV | | | | | | | | | | | | |
| | GE SE64 Silicone Rubber Gum | 5 | 5 | | | | | | | | | | |
| Polybutene | Amoco Indopol H1500 | | | | | | | | | 5 | | | |
| | Amoco Indopol H300 | | | | | | 5 | 3 | | | | | 5 |
| | Amoco Indopol E23 | | | | | | | | | | 5 | | |
| | Amoco Indopol E6 | 5 | | | | | | | | | | | |
| Acrylic Resin | Elvacite 2046 | | | | | | | | | | | | |
| | Elvacite 2045 | | | | | | | | | | | | |
| | Elvacite 2044 | | | | | | | | | | | | |
| Phenolic Resin | Varcum 29-033 | | 5 | | | 5 | 5 | | | 5 | 5 | 5 | 5 |
| Polyurethane | H2000 | | | | | | | | | | | | |
| EPDM | Uniroyal CP80 | | | | | | | | | | | 5 | |
| Linseed Oil | | | | 7 | 5 | | | | 7 | | | | |
| Mildewicide | Busan 1009 | 1.3 | 1.3 | 1.3 | 1.3 | 1.3 | 1.3 | 1.3 | 1.3 | 1.3 | 1.3 | 1.3 | 1.3 |
| | Troysan AF1 | | | | | | | | | | | | |
| Pigment | Burnt Umber 811 | | | | | | | | | | | | |
| Inhibitor | Tinuvin 292 | | | | | | | | | | | | |
| Solvent | Toluene | | | | | | | | | | | | |
| | Mineral Spirits | 40 | 40 | 40 | 40 | 40 | 40 | 40 | 40 | 40 | 40 | 40 | 40 |
| | Acetone | | | | | | | | | | | | |
| | Xylene | 17 | 17 | 17 | 17 | 17 | 17 | 17 | 17 | 17 | 17 | 17 | 17 |
| Beading Time (min.) | | 160+ | 160+ | 4 | 4 | 25 | 4 | 15 | 4 | 15 | 15 | 4 | 10 |

As seen in Table 2, acrylic resin by itself was not effective in increasing the beading time (formulations 6–8, 10, 15), nor was a combination of a silicone oil with acrylic resin (#5, 13). Combinations of acrylic and phenolic resins (#9) and acrylic resin and linseed oil (#10, 12) were also not effective in increasing the beading time of the reaction. The addition of a mildewicide with an inhibitor had no demonstrable effect (#16), and its combination with an acrylic resin (#17) or a silicone oil (#19) also did not have any positive effect. Changing the mildewicide similarly had no demonstrable effect in combination with an acrylic resin (#18) and with a polyurethane (#20). A marginally positive effect was noted for the combination of a polybutene with an acrylic resin (#14), a specialized silicone (#21), a specialized silicone with polybutene (#22), a specialized silicone with linseed oil (#23).

However, extremely beneficial and unexpected synergistic results were noted with silicone rubber gum was used in combination polybutenes (#24, 26, 29), with linseed oil (#25) optionally with a mildewicide (#27), and with a phenolic resin (#28, 30).

Poorer results were obtained with the use of a silicone fluid (#31–33) in combination with linseed oil and phenolic resin as were the results shown for various polybutenes were combined with phenolic resin (#35–38, 40) with phenolic resin and for phenolic resin alone (#34) and in combination with EPDM rubber (#39).

Additionally 30 month testing of various aspects of this invention were obtained using experimental compositions that were 8% solids by weight, and placed on a substrate of pressure treated wood with results shown in Table 3.

TABLE 3

| | | Parts by Weight | |
| --- | --- | --- | --- |
| Component | | 41 | 42 |
| Thompson's Water Seal | | | 100 |
| Silicone | GE SE64 Silicone Rubber Gum | 4 | |
| Polybutene | Amoco Indopol H300 | 4 | |
| Solvent | Mineral Spirits | 92 | |
| Beading Time (min.) | | 210+ | 20 |

The experimental formulation exceeded a commercially available product by more than a factor of 10.

Using the same experimental #41 solution, the side-by-side testing was repeated using untreated pine and an exposure time of 30 months with experimental results as shown in Table 4.

TABLE 4

| | | Parts by Weight | |
| --- | --- | --- | --- |
| Component | | 41 | 42 |
| Thompson's Water Seal | | | 100 |
| Silicone | GE SE64 Silicone Rubber Gum | 4 | |
| Polybutene | Amoco Indopol H300 | 4 | |
| Solvent | Mineral Spritis | 92 | |
| Beading Time (min.) | | 200 | 4 |

The results indicate that the experimental formulation clearly lasted longer than a commercially available product.

The above 30 month samples using untreated pine were then cleaned with a commercial deck cleaner that contained disodium peroxydicarbonate and the test repeated with results as shown in Table 5.

TABLE 5

| Component | | Parts by Weight | |
|---|---|---|---|
| | | 41 | 42 |
| Thompson's Water Seal | | | 100 |
| Silicone | GE SE64 Silicone Rubber Gum | 4 | |
| Polybutene | Amoco Indopol H300 | 4 | |
| Solvent | Mineral Spritis | 92 | |
| Beading Time (min.) | | 24 | 2 |

These results demonstrate that the experimental formulation is significantly more durable than a commercially available product.

A porous patio block 1.4 inches thick, 7.5 inches wide and 15.5 inches long was divided into three equal sections, One section was coated with Thompson's Water Seal, the middle section was uncoated while the third section was coated with the experimental #41 solution. After one week both coated areas beaded. However, after one year exposure to the elements, the following results were obtained as seen in following Table 6.

TABLE 6

| Component | | Parts by Weight | |
|---|---|---|---|
| | | 41 | 42 |
| Thompson's Water Seal | | | 100 |
| Silicone | GE SE64 Silicone Rubber Gum | 4 | |
| Polybutene | Amoco Indopol H300 | 4 | |
| Solvent | Mineral Spritis | 92 | |
| Beading Time (min.) | | 160+ | 0 |

Once again, the effectiveness of the experimental formulation is vividly demonstrated with an extremely porous substrate.

The results of the above testing indicates that the polymers included in this invention did not offer top performance parameters when used alone. In every case, the water repellent solutions provided better properties when these polymers were blended with a variety of other polymers. It is suggested that one possible explanation for this is that one polymer penetrates into the wood while the other remains closer to the surface. In some cases, one polymer plasticizes the other polymer to prevent embrittlement. The test results additionally indicate that the experimental water repellents of these inventions do not suffer as much UV degradation as the commercial products used as controls in the above experiments.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A water repellent composition comprising:
    a silicone rubber gum polymer;
    a second polymer in combination with the silicone rubber gum polymer, the second polymer being selected from the group consisting of polybutene, linseed oil and phenolic resin; and
    an organic solvent in which the silicone rubber gum polymer and the second polymer are at least partially soluble therein.

2. The composition of claim 1 which further comprises a mildewicide.

3. The composition of claim 1 which further comprises a pigment.

4. The composition of claim 1 which further comprises an inhibitor selected from the group consisting of an antioxidant, an ultraviolet absorber and a light stabilizer.

5. The composition of claim 1 wherein a ratio of the silicone rubber gum polymer to the second polymer is from 98 to 2% by weight and a ratio of the second polymer to the silicone rubber gum polymer is from 2 to 98% by weight.

6. The composition of claim 5 wherein the weight percent of the silicone rubber gum polymer and the second polymer is essentially equal.

7. The composition of claim 1 wherein when the polybutene is present, at least a portion of it is epoxidized.

8. The composition of claim 7 wherein the polybutene is an epoxidized polybutene.

9. The composition of claim 1 which further comprises a VOC exempt solvent.

10. The composition of claim 1 which further comprises mineral oil.

11. A water repellent composition comprising:
    a room temperature vulcanizing silicone polymer, the silicone polymer further comprising,
        a silanol-terminated polysiloxane having at least one hydroxy group, and
        a multifunctional silane having at least one substituent reactive group which condenses with the at least one hydroxy group of the silanol-terminated polysiloxane,
    a second polymer in combination with the silicone rubber gum polymer, the second polymer being selected from the group consisting of polybutene, linseed oil and phenolic resin; and
    an organic solvent in which the silicone rubber gum polymer and the second polymer are at least partially soluble therein.

12. The composition of claim 11 wherein the polysiloxane is a silanol-terminated polydimethylsiloxane.

13. The composition of claim 12 wherein the silanol-terminated polydimethylsiloxane has a molecular weight greater than or equal to about 2,000 and less than or equal to about 300,000.

14. The composition of claim 13 wherein the silanol-terminated polydimethylsiloxane has a molecular weight greater than or equal to about 26,000 and less than or equal to about 200,000.

15. The composition of claim 11 wherein the multifunctional silane is selected from the group consisting of an acyloxy, enoxy, oxime and acetoxy silane.

16. The composition of claim 11 wherein a weight percentage of silane to polysiloxane is from about 0.1% to 5%.

17. The composition of claim 11 which further comprises a silicone oil having a viscosity of from about 30,000 to 60,000 cps.

18. The composition of claim 11 which further comprises a mildewicide.

19. The composition of claim 11 which further comprises a pigment.

20. The composition of claim 11 which further comprises an inhibitor selected from the group consisting of an antioxidant, an ultraviolet absorber and a light stabilizer.

21. The composition of claim 11 wherein a ratio of the silicone rubber gum polymer to the second polymer is from 98 to 2% by weight and a ratio of the second polymer to the silicone rubber gum polymer is from 2 to 98% by weight.

22. The composition of claim 21 wherein the weight percent of the silicone rubber gum polymer and the second polymer is essentially equal.

23. The composition of claim 11 wherein when the polybutene is present, at least a portion of it is epoxidized.

24. The composition of claim 23 wherein the polybutene is an epoxidized polybutene.

25. The composition of claim 11 which further comprises a VOC exempt solvent.

26. The composition of claim 11 which further comprises mineral oil.

* * * * *